United States Patent Office 3,057,931
Patented Oct. 9, 1962

3,057,931
NITROFLUOROALKANES AND THEIR SYNTHESIS
Richard M. Scribner, Wilmington, Del., assignor to E. I. du Pont de Nemours and Company, Wilmington, Del., a corporation of Delaware
No Drawing. Filed June 23, 1959, Ser. No. 822,200
10 Claims. (Cl. 260—644)

This invention relates to, and has as its principal objects provision of, nitrofluoroalkanes and a process for the synthesis of the same.

The fluorocarbons are an industrially important class of compounds which are finding increasingly expanding fields of utility. Because of this, there is a continuing active research interest in fluorocarbon chemistry aimed at finding better and cheaper synthetic methods and at uncovering new types. As a result of such a study, a new reaction which produces fluorocarbon compounds, including a new class thereof, has been found.

The fluorocarbon compounds of this invention are nitrofluoroalkanes and are obtained by reacting an acyclic saturated halocarboxylic acid containing at least two fluorine atoms on the carbon alpha to the carboxylic group with at least an equimolar amount of nitrogen dioxide at a temperature of at least 100° C. These nitrofluorocarbon compounds correspond to $F(CF_2)_nNO_2$, where $n$ is an integer of at least 5, and to $H(CF_2)_mNO_2$, where $m$ is an integer of 1 or more. The last-mentioned class of compounds is novel and forms a part of the invention.

In one procedure for accomplishing the process of this invention, a pressure reactor is charged with an acyclic saturated fluorocarboxylic acid containing at least two fluorine atoms on the carbon alpha to the carboxylic group and nitrogen dioxide sufficient to provide at least one mole thereof per mole of the acid. The reactor is sealed, and the contents are heated to between 100° and 300° C. for at least one hour. The reactor is allowed to cool, and the contents are bled into a container cooled in liquid nitrogen. Normally volatile nitrofluoroalkanes are collected in the cooled container and normally liquid nitrofluoroalkanes remain in the reactor. The normally liquid nitrofluoroalkanes are removed from the reactor, washed with aqueous alkali metal bicarbonate, the washed product dried, and the dried product is then fractionally distilled. Normally gaseous nitrofluoroalkanes are separated by distillation through a low temperature still or by vapor phase chromatography.

The process of this invention is carried out at temperatures of 100° to 300° C. Generally, the best balance of reaction rate with product yield is obtained within the range of 125 to 250° C., and this range therefore embraces the conditions generally employed.

In the detailed examples which follow, the reaction is accomplished under autogenous pressure, but solely for convenience. If desired, pressures which range from below atmospheric and up to 500 atmospheres can be used but offer no practical advantage.

The time of reaction is at least one hour. Usually the reaction is permitted to proceed for three or more hours at reaction temperature, but extending it beyond 15 hours is not conducive to improved yields of desired product.

The nitrogen dioxide is employed in an amount at least equimolar to the carboxylic acid component. As a practical matter, amounts are used which correspond to two or more moles of the nitrogen dioxide per mole of acid, unreacted excess being vented after reaction is complete.

The use of a reaction medium is not essential. However, in some instances a reaction medium may be desirable to bring about better contact between the reactants. If such a medium is used, it should be one which is inert to the reactants and reaction products. Suitable media are $CCl_4$, $CHCl_3$, $C_2Cl_6$, benzene, chlorobenzene, perfluorodimethylcyclohexane, and hexafluoropropylene dimer.

When a reaction medium is used, it can equal or exceed the combined weights of the acid and nitrogen dioxide by several fold.

In the process of this invention any acyclic saturated carboxylic acids which contain two fluorines on the carbon alpha to the carboxyl group may be used. Acids which contain up to 20 carbon atoms are generally used because of their ready availability. Examples of operable acids are difluoroacetic acid, 2,2-difluoro-3-chloropropionic acid, perfluoropropionic acid, 3H-tetrafluoropropanoic acid, 2,2,3,4,4-pentafluoro-3,4-dichlorobutyric acid, 2,2,3,3-tetrafluoro-4,4,4-trichlorobutyric acid, perfluorobutyric acid, perfluoropentanoic acid, perfluorohexanoic acid, 7H-dodecafluoroheptanoic acid, perfluorodecanoic acid, 11H-eicosylfluoroundecanoic acid, 2,2-difluoro-3-bromopropionic acid, 2,2-difluoro-3-iodopropionic acid, 5H-octafluoropentanoic acid, 9H-hexadecafluorononanoic acid, perfluoroglutaric acid, perfluoroadipic acid, perfluoroylmalic, and the like.

In place of the free acids, there can be used the corresponding alkali or alkaline earth metal salts.

There follow some examples which illustrate but do not limit this invention.

*Example I*

An 80 ml. stainless steel pressure reactor was charged with 5.7 g. (0.05 mole) of trifluoroacetic acid and 13.8 g. (0.3 mole) of nitrogen dioxide. The charge was then heated to 200° C. and held at this temperature and autogenous pressure for 6 hours. The reactor was allowed to cool to room temperature, and the contents were then bled into an evacuated container cooled in liquid nitrogen. Infrared analysis of the contents of the cylinder showed absorption at 6.13, 6.17µ (doublet); 7.64, 7.78, 7.87µ (triplet); 8.59, 8.64, 8.69, 8.73µ (quadruplet); 11.50, 11.62, 11.72µ (triplet); 13.20, 13.33, 13.44µ (triplet). From the intensity of the absorption bands it was calculated that the product contained 10 to 15% of trifluoronitromethane, $CF_3NO_2$. The bands found in the infrared spectrum of the product corresponded to those in the spectrum of an authentic sample of pure $CF_3NO_2$.

*Example II*

A 200 ml. stainless steel pressure reactor was charged with 20 g. (0.05 mole) of perfluorooctanoic acid and 15 g. (0.33 mole) of nitrogen dioxide, and the contents were heated to 150° C. at the rate of 20° C. per hour. The charge was maintained at 150° C. for 2 hours. The reactor was allowed to cool to ambient temperature and then slowly vented to the atmosphere. There remained about 7 g. of liquid in the reactor, along with a trace of green salt. The liquid was washed with three 50-ml. portions of saturated aqueous sodium bicarbonate and then dried over anhydrous magnesium sulfate, giving about 3 g. of a colorless, mobile liquid. This material was distilled through a 4″ microspinning band column, and the following fractions were collected:

| Fraction | Head Temp., ° C. | Vol., ml. | Analysis, percent |
|---|---|---|---|
| 1 | 82 | 0.1 | N, 3.78. |
| 2 | 82–100 | 0.2 | N, 3.65. |
| 3 | 100–103 | 0.3 | N, 3.50; F, 66.39. |
| 4 | 103–113 | 0.5 | N, 3.42. |
| 5 | 115–121 | 0.5 | N, 3.31; F, 67.11. |
| 6 | 121–122 | 0.6 | N, 3.25. |
| 7 | 122 | 0.2 | N, 2.99. |
| Residue | | 0.2 | |

*Analysis.*—Calcd. for $C_7F_{15}NO_2$: N, 3.38; F, 68.6; $C_6F_{13}NO_2$: N, 3.84; F, 67.6.

Infrared analysis of fractions 4, 5, and 6 showed strong absorption at $6.15\mu$ and $7.74\mu$ for $NO_2$. Fluorine nuclear magnetic resonance absorption spectra of fraction 3 indicated it to be predominantly 1-nitroperfluorohexane and fraction 5 predominantly 1-nitroperfluoroheptane.

*Example III*

A 400 ml. stainless steel pressure reactor was charged with 20 g. (0.06 mole of 7H-dodecafluoroheptanoic acid and 20 g. (0.5 mole) of nitrogen dioxide, and the charge was heated to 160° C. over an 8-hour period at the rate of 20° C. per hour. The charge was maintained at 160° C. for 6 hours. Thereafter the reactor was allowed to cool to ambient temperature and then was vented to the atmosphere. There remained about 10 g. of a liquid which, after washing with three 50 ml. portions of saturated aqueous sodium bicarbonate and drying, weighed 5.5 g. Distillation of this material through an 8″ spinning band column gave the following fractions:

| Fraction | Head Temp., ° C. | Volume |
|---|---|---|
| 1 | 79–89 | 0.3 ml. |
| 2 | 89–111 | 0.5 ml. |
| 3 | 111 | 0.6 ml. |
| 4 | 111 | 0.5 ml. |
| 5 | 111 | 0.5 ml. |
| Residue (after recrystallization) | | 1 g. |

Vapor phase chromatography showed fraction 4 to contain 98% 1-nitro-6H-dodecafluorohexane and 1.3% of the major component of fraction 2. The $n_D^{25}$ of fraction 2 was 1.3028 and that of fraction 4 was 1.3022. Nuclear magnetic resonance showed that the structure was consistent with that of 1-nitro-6H-decafluorohexane, with one peak of intensity 4 and three peaks of intensity 2, one being a doublet. The assigned structure was consistent with the infrared spectrum obtained, which showed bands at $6.15\mu$ and $7.4\mu$ for nitro group.

*Analysis.*—Calcd. for $C_6HF_{12}NO_2$: C, 20.8; H, 0.29; F, 65.8; N, 4.08. Found: C, 21.25; H, 0.91; F, 65.9; N, 3.76, 3.99.

*Example IV*

Twenty-five grams of 2,2,3-trifluoro-3-chloropropanoic acid and 21 g. of nitrogen dioxide were placed in a stainless steel reactor and heated at 180° C. for 4 hours. The reactor was allowed to cool and then vented to the atmosphere. There remained ca. 12 g. of liquid, which, after washing with aqueous sodium bicarbonate and drying, weighed 5 g. Distillation of this material through an 8″ spinning band column gave the following fractions:

| Fraction | Head Temp., ° C. | Volume, ml. |
|---|---|---|
| 1 | 63 | 0.51 |
| 2 | 64 | 0.51 |
| 3 | 68 | 0.03 |
| Residue | | 0.10 |

*Analysis.*—Calcd. for $C_2HClF_3NO_2$: N, 8.72%; F, 32.8%. Found: N, 8.57; F, 32.3.

Infrared analysis showed the presence of the α-halocarbon hydrogen, CXH, group, with a band at $3.3\mu$ and the presence of a halonitro group with bands at $7.3\mu$ and $9.7\mu$.

The nitrofluoroalkanes of this invention are useful as high energy fuels, refrigerants, stable liquids, and aerosol propellants. They are also useful as solvents for fluoropolymers. Thus, polytetrafluoroethylene is soluble in the 1-nitro-6H-dodecafluorohexane of Example III and self-supporting films thereof are readily prepared by casting from these solutions and allowing the 1-nitro-6H-dodecafluorohexane to evaporate. Similarly films are prepared from solutions of copolymers of tetrafluoroethylene with 1,1,1-trifluoropropene in 1-nitro-6H-dodecafluorohexane.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process for preparing at least one nitrofluoroalkane which comprises contacting nitrogen dioxide with a member of the group consisting of acyclic saturated fluorocarboxylic acids of up to 20 carbons in which all substituents are halogen and which contain at least two fluorine atoms on the carbon alpha to the carboxyl group and alkali and alkaline earth metal salts thereof at superatmospheric pressure and at a temperature of about 100–300° C.

2. The process of claim 1 employing a perfluorinated acid.

3. The process of claim 1 employing an omega-hydroperfluoro acid.

4. The process of claim 1 employing an omega-chloroperfluoro acid.

5. The process of claim 1 employing trifluoroacetic acid.

6. The process of claim 1 employing perfluorooctanoic acid.

7. The process of claim 1 employing 7H-dodecafluoroheptanoic acid.

8. The process of claim 1 employing 2,2,3-trifluoro-3-chloropropanoic acid.

9. 1-nitro-6H-dodecafluorohexane.

10. A compound of the formula $H(CF_2)_mNO_2$, where $m$ is an integer between 1 and 19.

References Cited in the file of this patent

Haszeldine: "Nature," 168, 1029 (1951).